(No Model.)
C. HYMERS.
SELF ADJUSTING FISH-SHAPED FISH HOOK HOLDER.
No. 273,996. Patented Mar. 13, 1883.
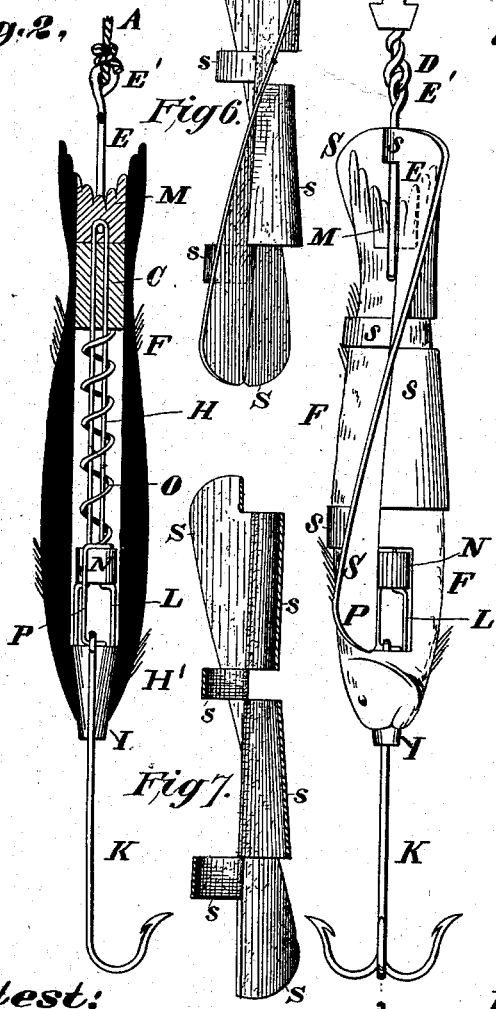
Attest:
Charles Pickles
Walter Allen
Inventor:
Christopher Hymers
By Knight Bro.
Attys.

UNITED STATES PATENT OFFICE.

CHRISTOPHER HYMERS, OF ST. LOUIS, MISSOURI.

SELF-ADJUSTING FISH-SHAPED FISH-HOOK HOLDER.

SPECIFICATION forming part of Letters Patent No. 273,996, dated March 13, 1883.

Application filed May 16, 1882. (No model.)

*To all whom it may concern:*

Be it known that I, CHRISTOPHER HYMERS, of the city of St. Louis, in the State of Missouri, have invented a certain new and useful Improvement in Self-Adjusting Fish-Shaped Fish-Hook Holders, of which the following is a specification, reference being had to the accompanying drawings, forming part of the same.

This invention is in some respects an improvement on the invention described in my patent dated 4th January, 1881, the hook being held between similar expanding jaws. There is, however, in addition, a safety-hook that may be used to prevent the opening of the jaws by the impingement of the fish's head against the hook when used in trolling. The jaws in this improvement are pushed into their conical socket and held therein by a spiral spring in place of a cam, as before. A spoon is provided, having its body slit transversely and the slit portions bent out in opposite directions to form bands, adapting the spoon to be slipped on and off the bait without disturbing the hook.

In the drawings, Figure 1 is a side view with the spoon attached, the spoon being shown in edge view. Fig. 2 is a longitudinal section of the device with the spoon removed, and also the swivel, the device being in the form for ordinary rod-fishing. Fig. 3 is a longitudinal section at 3 3, Fig. 1. Fig. 4 is a perspective view of the holding-jaws. Fig. 5 is a transverse section at 5 5, Fig. 3. Fig. 6 is an edge view of the spoon. Fig. 7 is a vertical section of the spoon on the line 7 7, Fig. 5.

A is the fishing-line. This line, in Fig. 1, is attached to the eye B, at the upper end of the swivel C.

D is the lower loop of the swivel, engaging the eye E' at the upper end of the bail E. The bail E has two inturned hooks, which enter holes in the side of the metal fish F, extending into a plug, G, inserted in an axial bore, H, that extends from end to end of the fish, but which at the lower end is made of conical form to force the gripping-jaws inward, as in my patent before mentioned.

I I are the gripping-jaws, engaging the stem of the fish-hook K and forced together by the conical form of the socket H' as they descend therein.

L is a link or hanger that is shown as composed of a single piece of wire bent at the top and its two legs extending down in the bore H, to the lower end of the same, where one of the gripping-jaws is attached to or made in one piece with each leg. The bent end of the link is secured in the knob M, so that when the knob is drawn upward the jaws I are drawn upward with it and spring outward from each other, releasing the hook K.

N is a block or collar resting on shoulders of the link L.

O is a spiral spring surrounding the link, whose ends bear against the block N and the plug G. The spring thus acts to force the jaws I downward into their socket H'. The legs of the link work freely through the plug G, the plug being held in place by the inturned ends of the bail E.

P is a hook secured loosely to the link above the block N, and whose end passes through the eye of the fish-hook, as shown, to prevent the disengagement of the hook from the jaws by the blow of a fish's head against it when trolling.

S is the spoon, which is formed to slip over the metal fish from the tail end, having its central part bent out into bands s, that bear upon the fish F.

To release the hook from the jaws I the knob M is drawn upward, which draws the jaws from the tapering socket H' and allows them to separate and release the hook.

I claim as my invention—

1. The combination of the gripping-jaws I, link L, knob M, and spring O, forcing the jaws into a tapering socket of the metal fish F.

2. The combination of the parts I, L, M, O, and fish F of the safety-hook P, substantially as and for the purpose set forth.

3. The spoon S, having bands s, adapted to be applied to fish-hook body F, as set forth.

CHRISTOPHER HYMERS.

Witnesses:
SAML. KNIGHT,
AUGUST WEBER.